(12) United States Patent
Portis et al.

(10) Patent No.: US 6,213,449 B1
(45) Date of Patent: Apr. 10, 2001

(54) HANDLES FOR BOTTOM OUTLET VALVE ASSEMBLY

(75) Inventors: Ralph G. Portis, Highland Park; Robert H. Dean, Evanston, both of IL (US)

(73) Assignee: Delaware Capital Formation, Inc., Wilmington, DE (US)

( * ) Notice: Subject to any disclaimer, the term of this patent is extended or adjusted under 35 U.S.C. 154(b) by 0 days.

(21) Appl. No.: 09/327,264

(22) Filed: Jun. 7, 1999

Related U.S. Application Data

(63) Continuation-in-part of application No. 09/014,921, filed on Jan. 28, 1998, now abandoned.

(51) Int. Cl.⁷ .................................................. F16K 51/00
(52) U.S. Cl. ............................ 251/144; 137/89; 137/347; 137/350; 292/255.5
(58) Field of Search ............................. 138/89; 251/144; 137/350, 347; 292/256.5

(56) References Cited

U.S. PATENT DOCUMENTS

| | | | |
|---|---|---|---|
| 3,672,403 | * 6/1972 | Wilson et al. ......................... | 138/89 |
| 3,722,549 | * 3/1973 | Wilson et al. ......................... | 138/89 |
| 4,000,703 | * 1/1977 | Halliar ............................ | 105/377.11 |
| 4,221,358 | * 9/1980 | Basler et al. ......................... | 251/144 |
| 4,270,729 | * 6/1981 | Behle et al. ......................... | 251/144 |
| 4,280,679 | * 7/1981 | Shaw ..................... | 251/144 |
| 4,527,489 | * 7/1985 | Schlink ................................ | 105/358 |
| 4,697,528 | * 10/1987 | Rehbein ............................... | 105/358 |
| 4,934,877 | * 6/1990 | Haverick et al. ..................... | 406/128 |
| 4,941,410 | * 7/1990 | Dalrymple et al. .................. | 105/358 |
| 5,076,539 | * 12/1991 | Holt ..................... | 251/144 |
| 5,222,517 | * 6/1993 | Zink et al. ............................ | 137/350 |
| 5,465,753 | * 11/1995 | Schwartz .............................. | 137/587 |
| 5,842,681 | * 12/1998 | Sisk ..................... | 251/144 |

* cited by examiner

*Primary Examiner*—A. Michael Chambers
*Assistant Examiner*—Thomas L. McShane
(74) *Attorney, Agent, or Firm*—Seyfarth Shaw

(57) ABSTRACT

A bottom outlet valve for a tank car having a bottom is provided. The valve includes a nozzle projecting from the bottom of the tank car and defining an opening and having a locking member, an outlet cap shaped and dimensioned to cover the opening and moveable between open and closed positions, wherein in the closed position the cap forms a substantially liquid-tight seal with the opening. The valve also includes at least one moveable handle coupled to the cap and having a locking portion engageable with the locking member and a hand gripping portion formed by structure defining a closed loop. Movement of the hand gripping portion causes engagement of the locking portion with the locking member, wherein when the locking member and locking portion are engaged, the outlet cap is retained in a closed position.

18 Claims, 8 Drawing Sheets

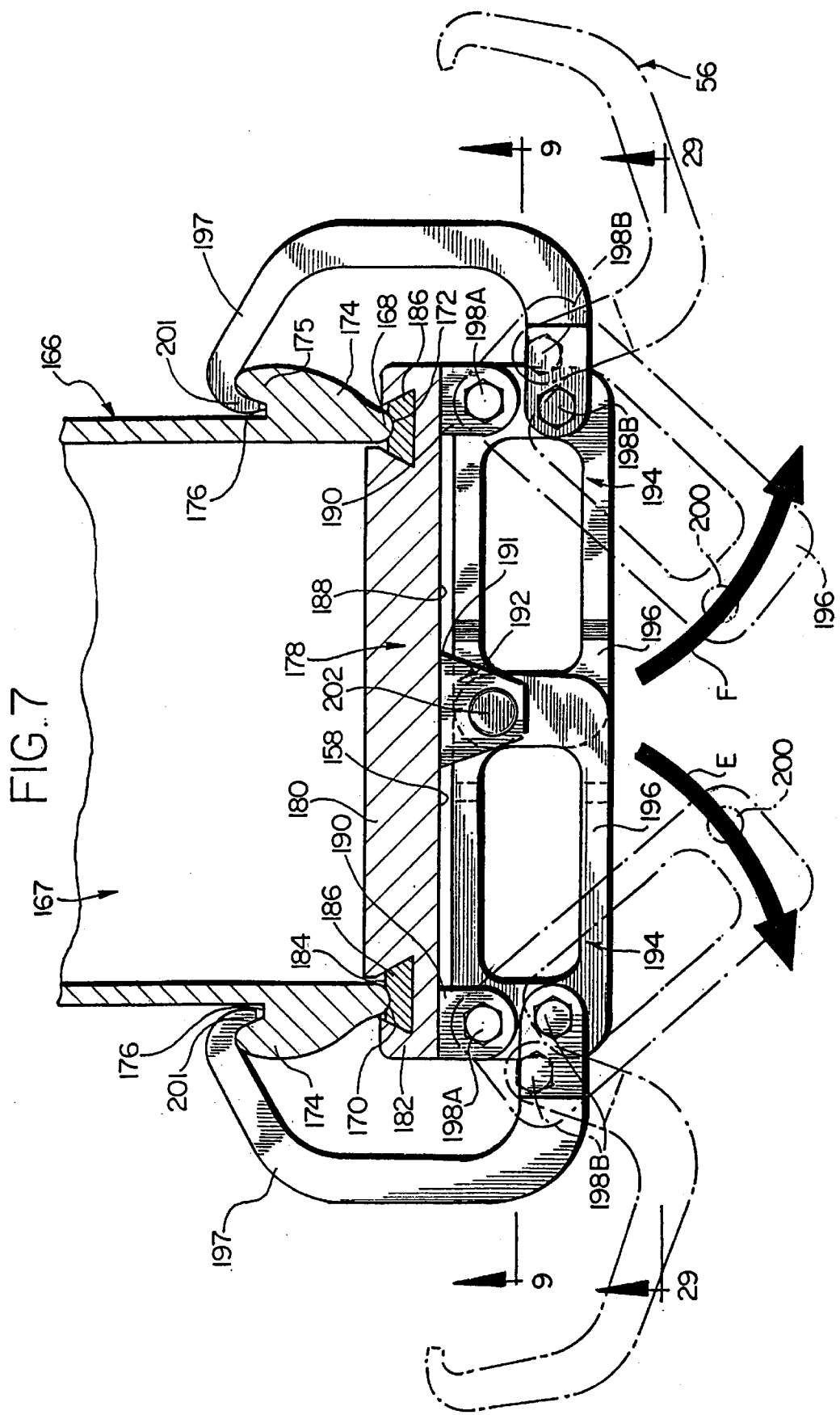

HANDLES FOR BOTTOM OUTLET VALVE ASSEMBLY

CROSS REFERENCE TO RELATED APPLICATION

This is a continuation-in-part of U.S. Ser. No. 09/014,921, filed Jan. 28, 1998, and entitled "Top Operated Bottom Outlet Valve Assembly", now abandoned.

BACKGROUND OF THE INVENTION

1. Field of the Invention

This invention relates generally to valves, and in particular to valves for railway tank cars.

2. Description of the Prior Art

There have been several bottom valves for liquid tank cars (such as rail cars), having handles attached to the valve outlet cap which, when moved, have a locking portion cooperating with a locking portion of the nozzle of the valve to lock the outlet cap to the nozzle in a liquid-tight manner. These handles usually have a generally linear, and free end, which is grabbed by a user to move the handles between open and closed position. When the handles are in the closed position, the linear end is generally parallel to and very close to the bottom of the outlet cap leaving little space between the cap and the linear end. This small space makes it very difficult for a user, often wearing gloves, to grasp and move the handles to their open position.

Additionally, the tank nozzle and/or cap are often partially covered with ladings, or debris, such as solidified corn syrup, from the contents of the tank car which prevent proper engagement of the locking portion of the cap and nozzle. Rather than clean the ladings, the tendency of many users is to force the handles. Since the end portion is linear and free, often a user will attach a lever, such as a pipe extension or wrench to gain leverage to move the handles to wedge the cap against the nozzle. This excess force may cause the handles to be bent, broken or otherwise damaged.

SUMMARY OF THE INVENTION

It is a general object of the invention to provide an improved tank bottom valve assembly which avoids the disadvantages of prior valves while affording additional structural and operational advantages.

An important feature of the invention is the provision of a tank car bottom valve assembly which is of a relatively simple and economical construction.

Another feature of the invention is the provision of a valve assembly of the type set forth which has an outlet cap for closing the valve with handles that provide a user with both the structure and space to obtain a firm hand hold.

A still further feature of the invention is the provision of an assembly of the type set forth which provides an outlet cap with handles which cannot easily be forced.

Certain ones of these and other features of the invention may be attained by providing a bottom outlet valve for a tank car. The valve includes a nozzle projecting from the bottom of the tank car and defining an opening and having a locking member, and an outlet cap shaped and dimensioned to cover the opening and moveable between an open position and a closed position, wherein in the closed position the cap forms a substantially liquid-tight seal with the opening. The nozzle also includes at least one moveable handle coupled to the cap and having a locking portion engageable with the locking member and a hand gripping portion formed by structure defining a closed loop, wherein movement of the hand gripping portion causes engagement of the locking portion with the locking member. When the locking member and locking portion are engaged, the outlet cap is retained in a closed position.

The invention consists of certain novel features and a combination of parts hereinafter fully described, illustrated in the accompanying drawings, and particularly pointed out in the appended claims, it being understood that various changes in the details may be made without departing from the spirit, or sacrificing any of the advantages of the present invention.

BRIEF DESCRIPTION OF THE DRAWINGS

For the purpose of facilitating an understanding of the invention, there is illustrated in the accompanying drawings a preferred embodiment thereof, from an inspection of which, when considered in connection with the following description, the invention, its construction and operation, and many of its advantages should be readily understood and appreciated.

FIG. 7 is an enlarged, sectional view taken generally alone line 7—7 of FIG. 5;

DETAILED DESCRIPTION OF THE PREFERRED EMBODIMENTS

Figure 1:
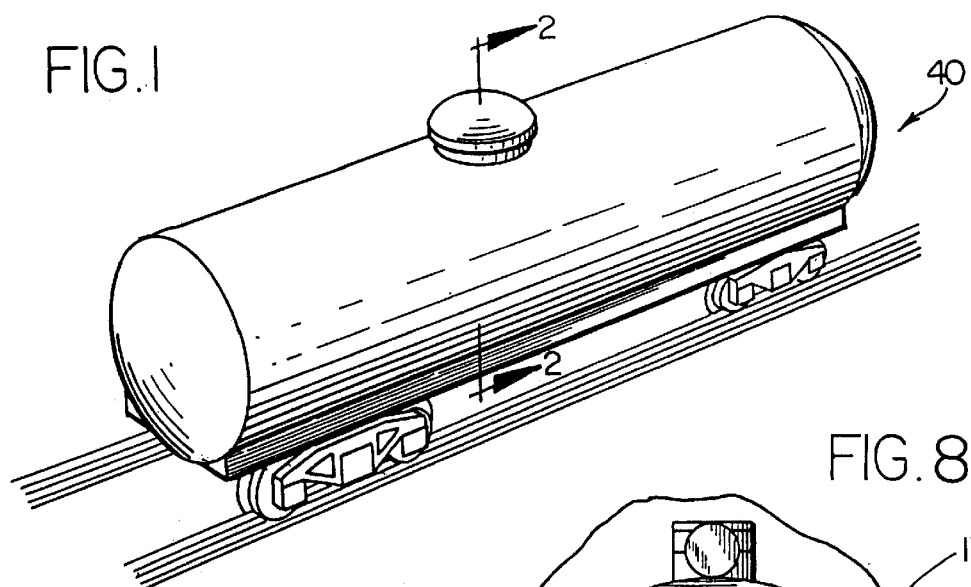
FIG. 1 is a perspective view of a railway tank car embodying the present invention.
Figure 2:
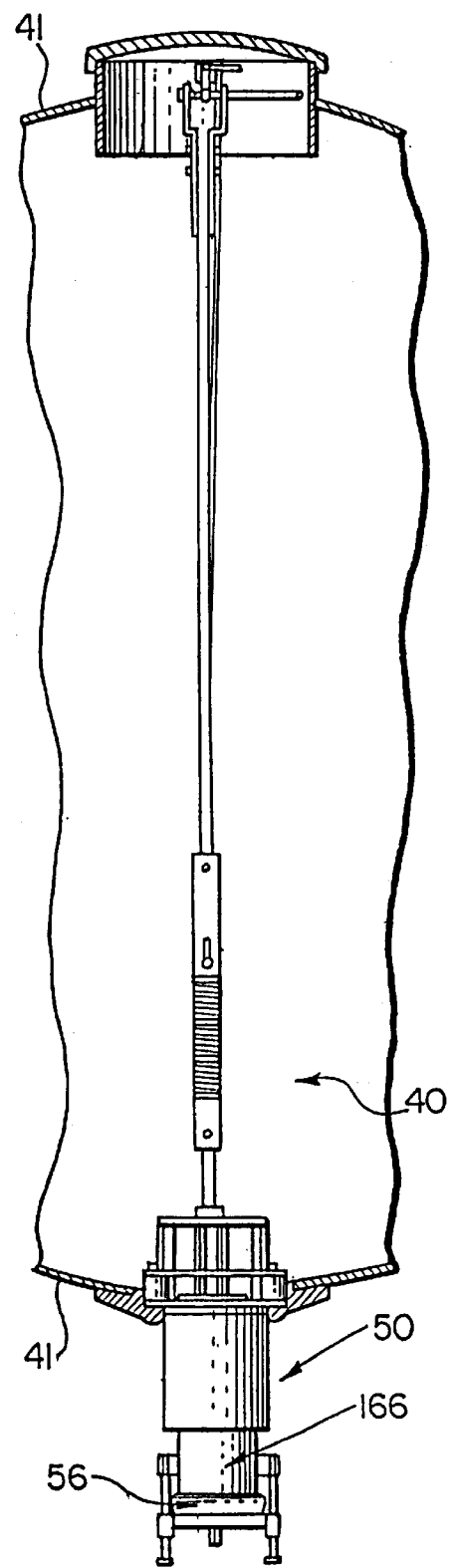
FIG. 2 is an enlarged, fragmentary, transverse, sectional view taken generally along line 2—2 of FIG. 1.

Referring to FIG. 1, a tank car 40, such as a rail car, for transporting liquids is illustrated. As seen in FIG. 2, the tank car 40 has a cylindrical sidewall 41. The tank car 40 includes a bottom outlet valve assembly 50.

The bottom outlet valve assembly 50 includes a primary valve 54 disposed essentially within the sidewall 41 and a secondary valve or closure 56 disposed essentially outside the sidewall 41.

As seen in FIG. 2, the secondary closure 56 is welded or otherwise coupled to the saddle 63. The secondary closure 56 includes a tubular nozzle 166 disposed and projecting from a bottom portion 52 of the tank car 40. The nozzle 166 is formed by a circular sidewall 167, and, as seen in FIG. 7, has a terminal end 168 which defines a circular opening 170 and a circular seat 172. The nozzle 166 also has an annular, radially outwardly extending projection 174 disposed at the terminal end 168. The annular projection 174 includes an annular portion 175 spaced from the sidewall 167 and forming a groove 176 therebetween, the groove 176 and the annular portion 175 defining a keeper. The secondary closure 56 also includes a circular outlet cap 178, which includes a thicker central portion 180 and a thinner peripheral portion 182. An annular grove 184 is formed between the central portion 180 and the peripheral portion 182. A seal 186 is disposed in the annular groove 184.

Figure 9:
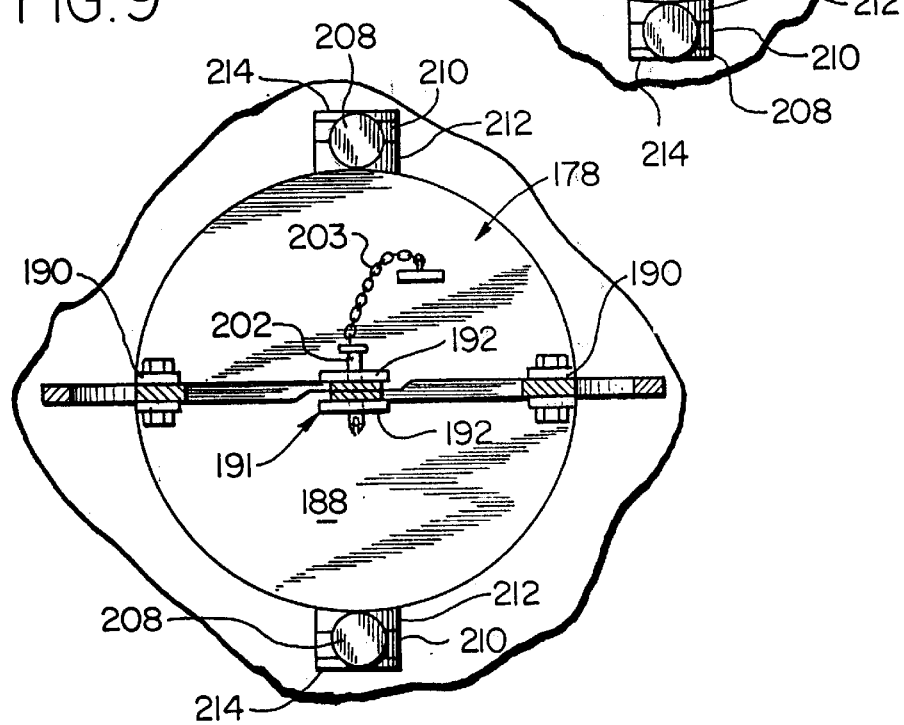
FIG. 9 is a sectional view taken generally along line 9—9 of FIG. 7.

As seen in FIGS. 7 and 9, the outlet cap 178 has a bottom 188. Connected to and depending from the bottom 188 are two diametrically opposed U-shaped brackets 190 and a central U-shaped bracket 191 having a pair of legs 192, each having an aperture 193 (FIG. 4).

Figure 8:
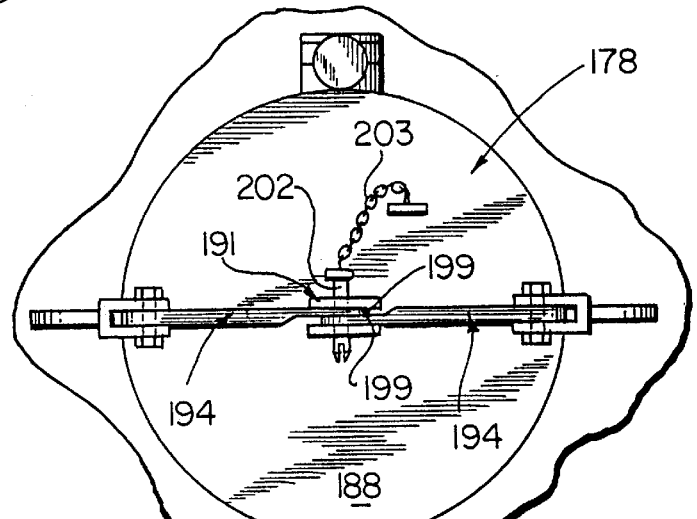
FIG. 8 is a sectional view taken generally along line 8—8 of FIG. 7.
Figure 3:
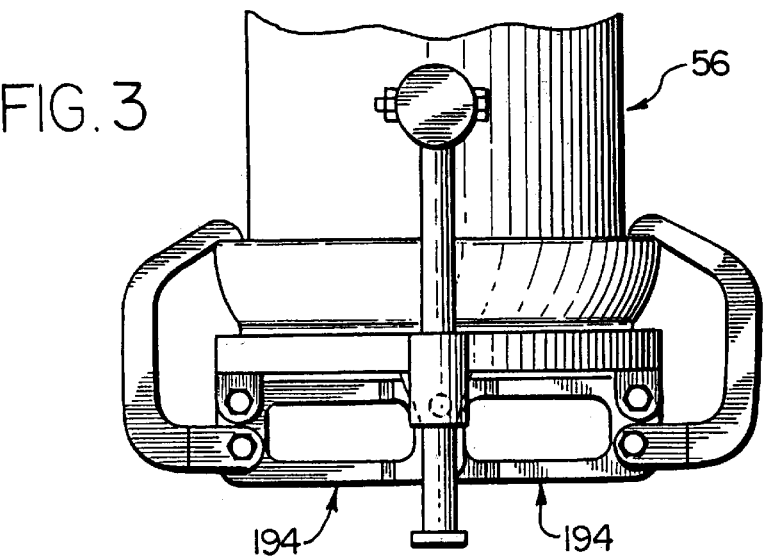
FIG. 3 is an enlarged, fragmentary side elevation view illustrating the secondary valve of FIG. 2 in a closed position.
Figure 4:
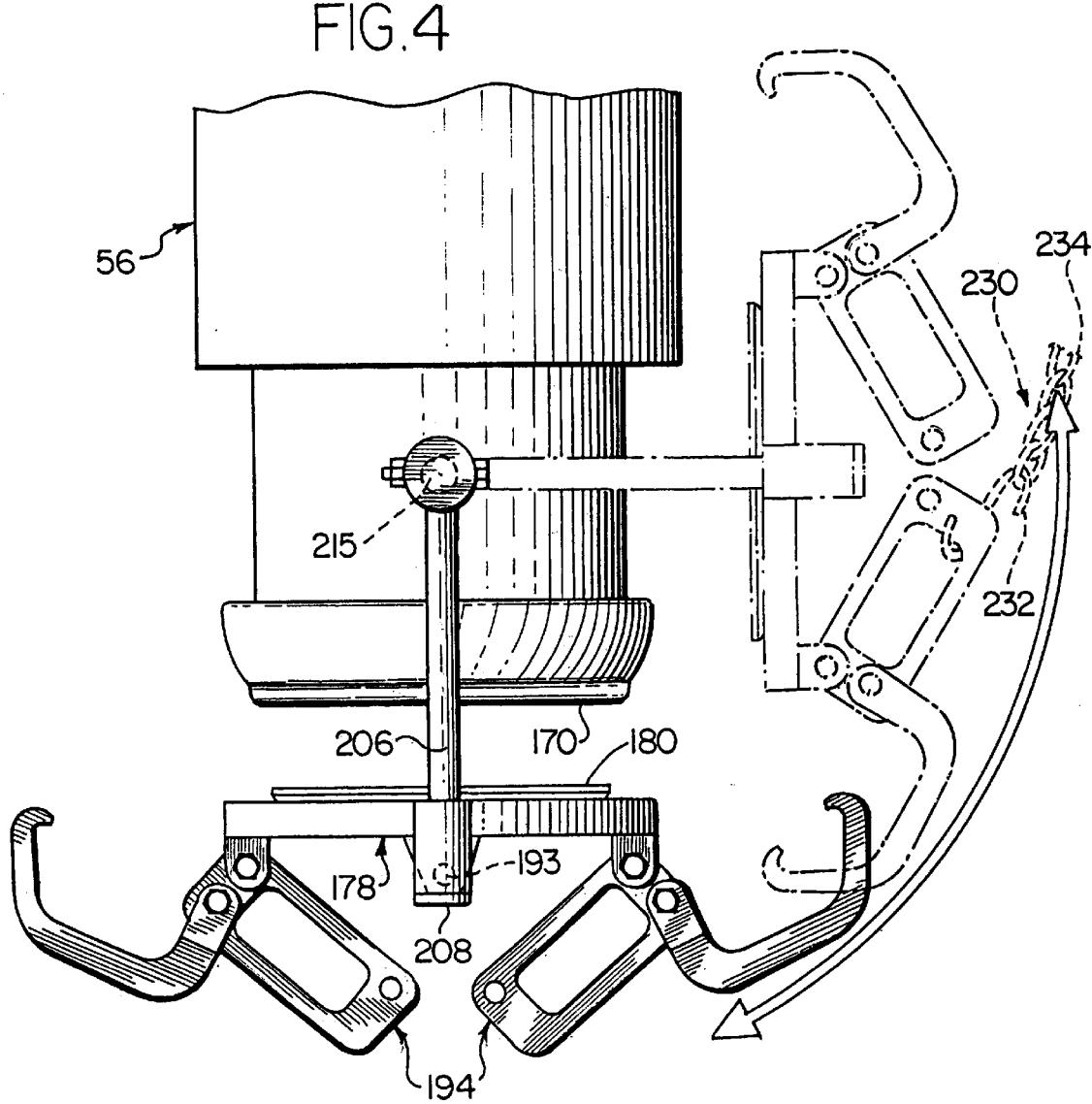
FIG. 4 is a view similar to FIG. 3 illustrating the secondary valve in an opened position.
Figure 5:
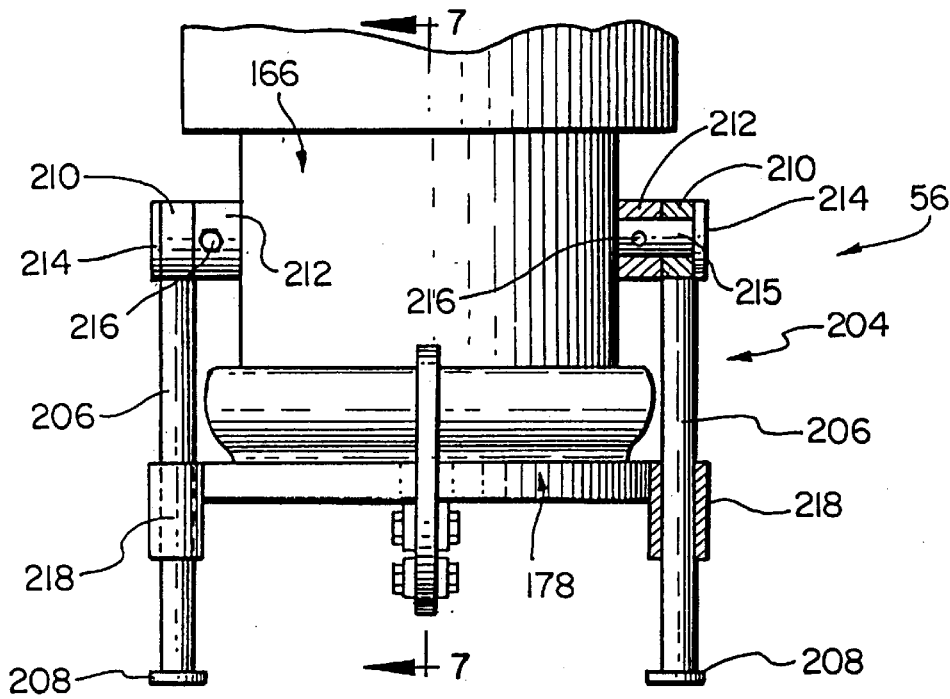
FIG. 5 is a fragmentary, side elevational view, in partial section, illustrating the secondary valve of FIG. 3 in a closed position.
Figure 6:
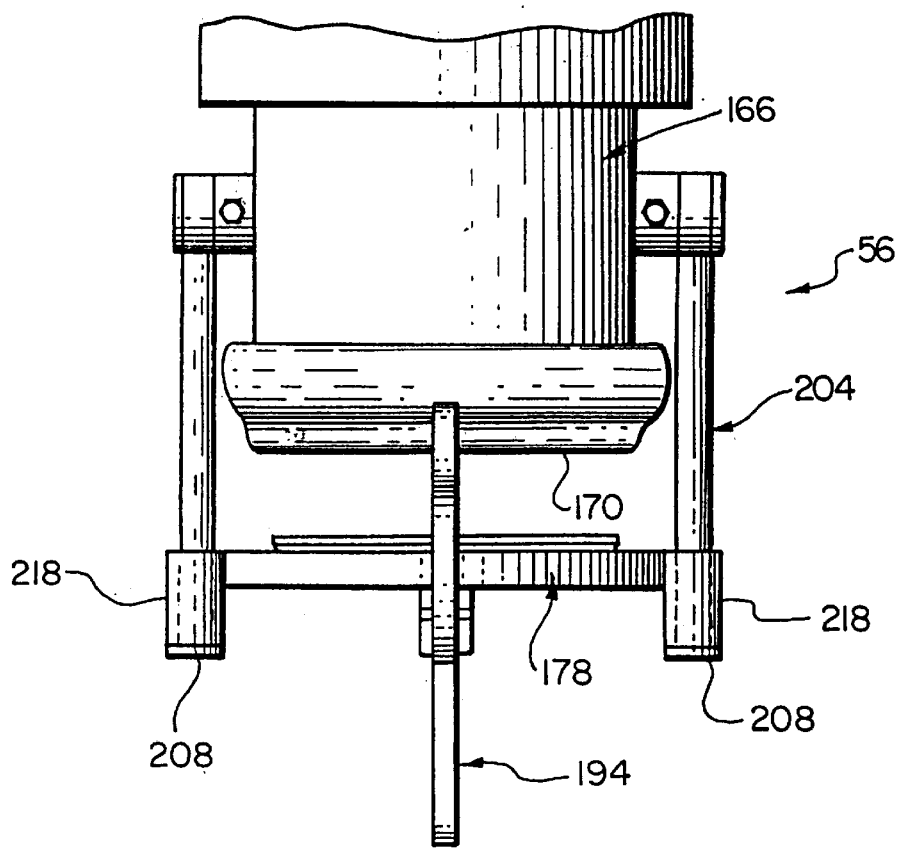
FIG. 6 is a view similar to FIG. 5, illustrating the secondary valve in an open position.
Figure 10:
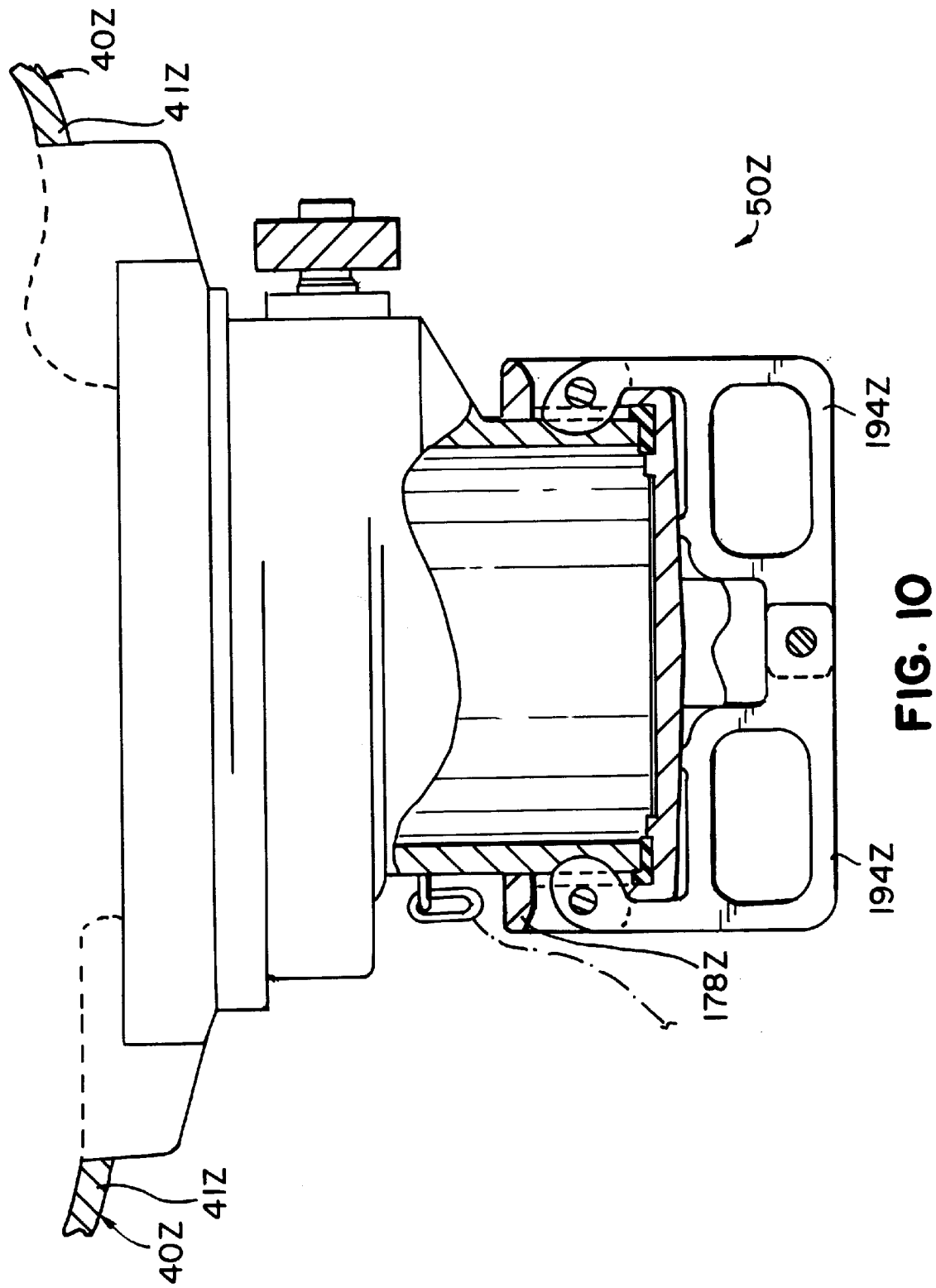
FIG. 10 is a side elevational view, partially in section, of an alternate bottom outlet valve of the present invention.
Figure 12:
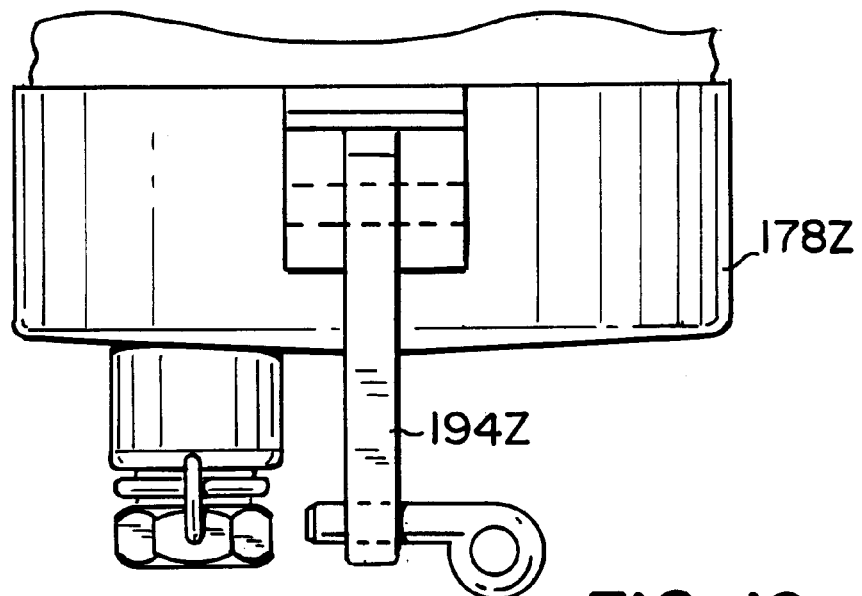
FIG. 12 is a side-elevational view of the outlet cap and handles of FIG. 10, as viewed from the right-hand side thereof.
Figure 13:
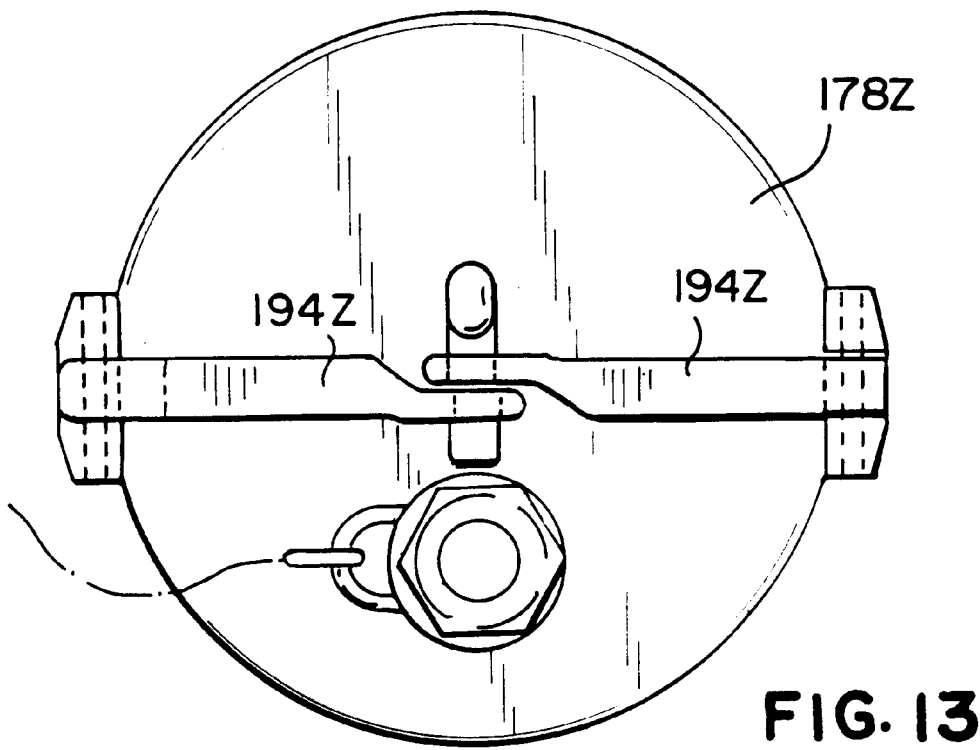
FIG. 13 is a bottom plan view of the outlet cap and handles of FIG. 12.
Figure 11:
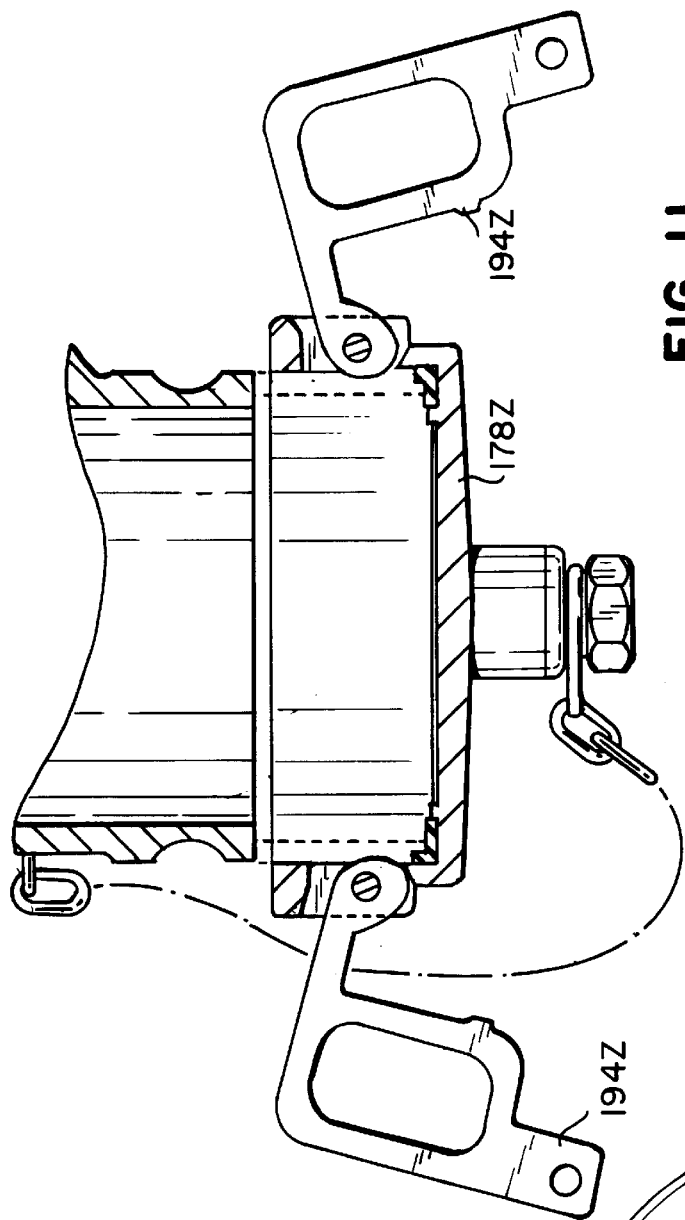
FIG. 11 is a sectional view of the bottom of the outlet valve of FIG. 10 when the handles have been moved from a locked position.
Figure 14:
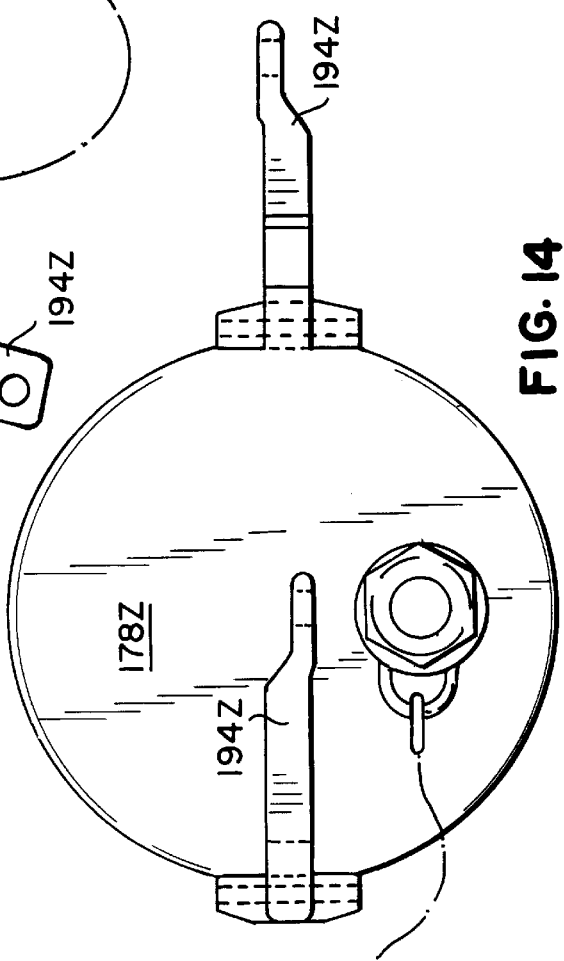
FIG. 14 is a bottom plan view of the outlet cap and handles of FIG. 12 after one of the handles has been moved.

As seen in FIGS. 3–7, two handles 194 are pivotally coupled to the outlet cap 178. Each handle 194 includes a generally rectangular (or box-shaped) hand portion 196 in the form of a closed loop and having a generally rectangular hand aperture shaped and dimensioned to receive a users hand. Hand portions 196 may also have other closed loop shapes. Each hand portion 196 is pivotally coupled by a bolt 198A to an associated U-shaped bracket 190. Each handle 194 includes a hook-engaging portion 197 pivotally coupled to the hand portion 196 by a bolt 198B which also acts as a fulcrum for hand portion 196. Each hand portion 196 also includes a thinned end 199 (FIG. 8) having an aperture 200 (FIG. 9). Each hook-engaging portion 197 includes an engaging end 201. As discussed further below, the outlet cap 178 is moveable between open and closed positions. In the closed position, as illustrated in FIGS. 3, 5, and 7, the handles 194 force the seal 186 of the outlet cap 178 against the seat 172 of the nozzle 166 to form a liquid-tight seal therebetween. In the open position, as shown in FIGS. 4 and 6, the seal 186 is disposed away from seat 172 and a liquid-tight seal is not effectuated, whereby liquid can flow out of the valve opening 170.

The handles 194 are each moveable between locked and unlocked conditions. In the locked condition, hand portions 196 are pivoted so that locking apertures 200 are each aligned with aperture 193 of the U-shaped bracket 191. (When the locking aperture 200 and aperture 193 are not aligned, the handles 194 are in their unlocked condition.) A stop pin 202 is placed through aligned locking aperture 200 and aperture 193 to maintain the handles 194 in the locked condition. To prevent its loss and to provide easy access, the stop pin 202 may be permanently affixed to the outlet cap 178 by a chain 203 coupled, such as by welding, to both the outlet cap 178 and the stop pin 202. As seen in FIG. 7, when the engaging ends 201 of the hook engaging portions 197 are disposed in groove 176, and the handles 194 are in their locked conditions, the outlet cap 178 is placed in its closed position.

To remove the outlet cap 178 from its closed position, hand portions 196 are respectively pivoted about bolts 198 in the direction of arrows E and F in FIG. 7. This pivoting combined with lifting causes the engaging end 201 of each hook engaging portion 197 to be raised out of the groove 176 and laterally moved away therefrom as indicated in broken line in FIG. 7, allowing the outlet cap 178 to be free to be lowered down from its closed position.

The outlet cap 178 is advantageously coupled to the sidewall 167 of the nozzle by a slide assembly 204, which includes two rods 206. As best seen in FIG. 5, each rod 206 includes an annular stop projection 208 at one end and a tubular connection 210 at its other end.

The slide assembly 204 is pivotally coupled to the nozzle 166. As seen in FIG. 5, the nozzle 166 has two diametrically opposed tubular projections 212. Two pins 214, each having a shaft 215, are respectively disposed through the tubular connections 210 and associated tubular projections 212. Each shaft 215 has an aperture and is locked in place by a bolt 216 passing through the aperture and an associated tubular projection 212. The rods 206 are thus each pivoted about an associated shaft 215.

As seen in FIG. 5, the outlet cap 178 has two diametrically opposed tubular members 218. Each tubular member 218 coaxially slidably receives one of the rods 206, thereby slidably coupling the outlet cap 178 to the slide assembly 204.

As seen in FIGS. 3–6, when the handles 194 are moved from their locked conditions, as shown by the dashed lines of FIG. 7, the outlet cap 178 will slide down the rods 206 until the tubular members 218 contact the stop projections 208, as seen in FIGS. 17 and 19, thereby moving from its closed position to an open position.

As seen in FIG. 4, when the outlet cap 178 is in this open position, the rods 206 and the outlet cap 178 coupled thereto can be pivoted about shafts 215 from beneath the nozzle 166, so that no portion of the outlet cap 178 or handles 194 lie below valve opening 170 or imaginary cylindrical extensions thereof, thereby allowing a hose connection to be made to annular projections 174 and 175, or allowing unimpeded liquid flow out of the valve opening 170 if no hose connection is made.

As seen in FIG. 4, the outlet cap 178 and handle 194 may be maintained in this out-of-the-way position by a hook and chain arrangement 230. This arrangement includes a hook 232 at on end of a chain 234 coupled to the lower hand portion 194 and the other end of the chain 234 permanently coupled to the sidewall 41 of the tank car 40.

FIGS. 10–14 illustrate an alternative bottom outlet valve assembly 50Z attached to the bottom of a sidewall 41Z of tank car 40Z which also includes a pair of handles 194Z, each having a box-shaped hand portion 196Z coupled to an outlet cap 178Z.

While a particular embodiment of the present invention has been shown and described, it will be appreciated by those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

What is claimed is:

1. A bottom outlet valve for a tank car having a bottom, the valve comprising:
   a nozzle projecting from the bottom of the tank car and defining an opening and having a locking member;
   an outlet cap shaped and dimensioned to cover the opening and moveable between an open position and a closed position, wherein in the closed position the cap forms a substantially liquid-tight seal with the opening;

at least one moveable handle having a locking portion engageable with the locking member and a hand gripping portion formed by structure defining a closed loop and pivotally coupled to the cap, wherein pivotal movement of the hand gripping portion with respect to the cap causes engagement of the locking portion with the locking member, wherein when the locking member and locking portion are engaged, the outlet cap is retained in a closed position.

2. The valve of claim 1, wherein the loop is generally rectangular and defines a generally rectangular aperture.

3. The valve of claim 1, wherein the handle gripping portion is pivotally coupled to the cap.

4. The valve of claim 3, wherein the locking portion is pivotable with respect to the hand gripping portion.

5. The valve of claim 3, wherein the locking member includes a groove and the locking portion includes a hook disposable within the groove.

6. The valve of claim 1, including first and second moveable handles respectively moveable between open and locked positions, and pivotably coupled at diametrically opposed ends of the outlet cap, the first and second handles respectively having first and second free ends which are aligned near the center of the cap when the handles are in the locked position.

7. The valve of claim 6, wherein the first and second free ends respectively have first and second apertures which are aligned in the locked condition, and further comprising a lock pin disposable through the first and second apertures to maintain the handles in the locked position.

8. A bottom outlet valve for a tank car having a bottom, the valve comprising:

a nozzle projecting from the bottom of the tank car defining an opening and having a groove therearound;

an outlet cap shaped and dimensioned to cover the opening and moveable between an open position and a closed position, wherein in the closed position the cap forms a substantially liquid-tight seal with the opening; and at least one movable handle pivotally coupled to the cap, the handle including a hook engaging portion pivotally attached to a hand gripping portion, wherein movement of the hand gripping portion causes an engaging end of the hook engaging portion to move vertically and laterally into or out of engagement with the groove, wherein when the engaging end and the groove are engaged, the outlet cap is retained in a closed position.

9. The valve of claim 8, wherein the hand gripping portion is generally rectangular and defines a generally rectangular aperture.

10. The valve of claim 8, including first and second moveable handles respectively moveable between open and locked positions, and pivotally coupled at diametrically opposed ends of the outlet cap, the first and second handles respectively having first and second free ends which are aligned near the center of the cap when the handles are in the locked position.

11. The valve of claim 10, wherein the first and second free ends respectively have first and second apertures which are aligned in the locked condition, and further comprising a lock pin disposable through the first and second apertures to maintain the handles in the locked position.

12. A bottom outlet valve for a tank car having a bottom, the valve comprising:

a nozzle projecting from the bottom of the tank car and defining an opening and having a locking member;

an outlet cap shaped and dimensioned to cover the opening and moveable between an open position and a closed position, wherein in the closed position the cap forms a substantially liquid-tight seal with the opening;

at least one rod connecting the outlet cap to the nozzle, the rod pivotally connected to the nozzle and connected to the outlet cap so as to allow axial movement of the outlet cap lengthwise of the rod; and at least one moveable handle coupled to the cap and having a locking portion engageable with the locking member and a hand gripping portion formed by structure defining a closed loop, wherein movement of the hand gripping portion causes engagement of the locking portion with the locking member, wherein when the locking member and locking portion are engaged, the outlet cap is retained in a closed position.

13. The valve of claim 12, wherein the loop is generally rectangular and defines a generally rectangular aperture.

14. The valve of claim 12, wherein the hand gripping portion is pivotally coupled to the cap.

15. The valve of claim 12, wherein the locking portion is pivotable with respect to the hand gripping portion.

16. The valve of claim 12, wherein the locking member includes a groove and the locking portion includes a hook disposable within the groove.

17. The valve of claim 12, including first and second moveable handles respectively moveable between open and locked positions, and pivotably coupled at diametrically opposed ends of the outlet cap, the first and second handles respectively having first and second free ends which are aligned near the center of the cap when the handles are in the locked position.

18. The valve of claim 17, wherein the first and second free ends respectively have first and second apertures which are aligned in the locked condition, and further comprising a lock pin disposable through the first and second apertures to maintain the handles in the locked position.

* * * * *

UNITED STATES PATENT AND TRADEMARK OFFICE
CERTIFICATE OF CORRECTION

PATENT NO. : 6,213,449 B1  
DATED : April 10, 2001  
INVENTOR(S) : Portis et al.

Page 1 of 1

It is certified that error appears in the above-identified patent and that said Letters Patent is hereby corrected as shown below:

Title page,
Add to Item [56] References Cited, U.S PATENT DOCUMENTS,

| | | |
|---|---|---|
| -- 1,484,062 | 02/1924 | Conner |
| 3,176,880 | 04/1965 | Archbold |
| 3,339,791 | 09/1967 | De Frees |
| 3,344,947 | 10/1967 | Gallup |
| 3,672,403 | 06/1972 | Wilson et al. |
| 3,698,592 | 10/1972 | Nelson |
| 4,000,703 | 01/1977 | Halliar |
| 4,014,367 | 03/1977 | Milo |
| 4,057,020 | 11/1977 | Halliar et al. |
| 4,457,349 | 07/1984 | Vazin |
| 4,676,573 | 06/1987 | Norman |
| 4,819,827 | 04/1989 | DiSesa |
| 5,018,772 | 05/1991 | Obermeyer et al. -- |

Item [56], References Cited,

-- OTHER PUBLICATIONS

Literature of Salco Products entitled "6" Quick-Connect Unloading Assembly --

Signed and Sealed this

Twenty-fifth Day of December, 2001

Attest:

*Attesting Officer*

JAMES E. ROGAN  
*Director of the United States Patent and Trademark Office*